(12) United States Patent
Huang et al.

(10) Patent No.: US 11,797,218 B2
(45) Date of Patent: Oct. 24, 2023

(54) METHOD AND DEVICE FOR DETECTING SLOW NODE AND COMPUTER-READABLE STORAGE MEDIUM

(71) Applicant: Beijing Xiaomi Mobile Software Co., Ltd., Beijing (CN)

(72) Inventors: Haibin Huang, Beijing (CN); Lisheng Sun, Beijing (CN); Chen Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/856,338

(22) Filed: Apr. 23, 2020

(65) Prior Publication Data
US 2021/0132855 A1   May 6, 2021

(30) Foreign Application Priority Data
Nov. 4, 2019   (CN) .......................... 201911065412.2

(51) Int. Cl.
G06F 12/00   (2006.01)
G06F 3/06   (2006.01)
G06F 16/182   (2019.01)

(52) U.S. Cl.
CPC ............ *G06F 3/0653* (2013.01); *G06F 3/067* (2013.01); *G06F 3/0611* (2013.01); *G06F 3/0647* (2013.01); *G06F 16/1824* (2019.01)

(58) Field of Classification Search
CPC .... G06F 3/0653; G06F 3/0611; G06F 3/0647; G06F 3/067; G06F 16/1824
See application file for complete search history.

(56) References Cited

U.S. PATENT DOCUMENTS 5,121,495 A  *  6/1992  Nemes ................ G06F 16/9014
2002/0177910 A1*  11/2002  Quarterman ............ H04L 45/70
                                                                              700/28
(Continued)

FOREIGN PATENT DOCUMENTS

CN   104331520 A  *  2/2015
CN   105824934 A     8/2016
(Continued)

OTHER PUBLICATIONS

Extended European Search Report in European Application No. 20181752.5, dated Nov. 13, 2020.
"Cloudera Introduction", Cloudera Inc., May 27, 2016, 83 pages.

*Primary Examiner* — David Yi
*Assistant Examiner* — Tahilba O Puche
(74) *Attorney, Agent, or Firm* — Finnegan, Henderson, Farabow, Garrett & Dunner, L.L.P.

(57) ABSTRACT

A method for detecting a slow node includes: obtaining a generated record for a first storage node, the generated record including a storage node generation time, and a number of times and consuming time for transmitting data to second storage nodes other than the first storage node; obtaining a valid record from the generated record, the valid record being generated within a preset time period, and the preset time period being within a time period between the storage node generation time and a current time; determining an average consuming time for the first storage node transmitting the data to each of the second storage nodes, based on the number of times and the consuming time in the valid record; and detecting the slow node in the second storage nodes based on the average consuming time.

15 Claims, 14 Drawing Sheets

(56) References Cited

U.S. PATENT DOCUMENTS

| | | | | |
|---|---|---|---|---|
| 2006/0069883 A1* | 3/2006 | Shimizu | ............... | G06F 16/28 |
| | | | | 711/154 |
| 2006/0184563 A1* | 8/2006 | Potter | ............... | G06F 16/2474 |
| | | | | 707/999.102 |
| 2007/0028135 A1* | 2/2007 | Moore | ............... | G06F 11/3419 |
| | | | | 714/E11.195 |
| 2013/0204948 A1* | 8/2013 | Zeyliger | ............ | G06F 9/44505 |
| | | | | 709/221 |
| 2016/0306722 A1* | 10/2016 | Zou | ............... | G06F 11/3027 |
| 2017/0177220 A1* | 6/2017 | Shen | ............... | G06F 3/0611 |
| 2018/0157438 A1* | 6/2018 | Zhang | ............... | G06F 3/0659 |
| 2019/0238327 A1* | 8/2019 | Li | ............... | H04L 9/0861 |
| 2019/0370486 A1* | 12/2019 | Wang | ............... | G06Q 20/382 |

FOREIGN PATENT DOCUMENTS

| | | | |
|---|---|---|---|
| CN | 106878388 A | | 6/2017 |
| CN | 105824934 B | * | 6/2019 |
| CN | 110162270 A | | 8/2019 |

\* cited by examiner

METHOD AND DEVICE FOR DETECTING SLOW NODE AND COMPUTER-READABLE STORAGE MEDIUM

CROSS-REFERENCE TO RELATED APPLICATION

This application is based upon and claims priority to Chinese Patent Application No. 201911065412.2, filed on Nov. 4, 2019, the entire content of which is incorporated herein by reference.

TECHNICAL FIELD

The present disclosure relates to the technical field of distributed storage systems, and in particular, to a method and device for detecting a slow node, and a computer-readable storage medium.

BACKGROUND

A distributed-system basic framework, e.g., Hadoop, has a function of storing and analyzing massive data, and multiple Hadoops form a Hadoop cluster. The Hadoop cluster includes a server, also referred to as NameNode, that stores file metadata information and a server, also referred to as DataNode, that actually stores data. Because the Hadoop cluster is in an uninterrupted working state, there are often DataNodes in the Hadoop cluster where the network transmission of data is slow or the data reading and writing on a disk is slow. Each DataNode corresponds to a data storage node. Therefore, the data storage node corresponding to the DataNode where the network transmission of data becomes slow and the data reading and writing on the disk becomes slow in the Hadoop cluster is referred as a slow node. In the Hadoop cluster, the slow node may reduce the performance of reading and writing big data in the distributed-system basic framework. Therefore, it is necessary to detect the slow node in the Hadoop cluster. But at present, the accuracy of detecting the slow node in data storage nodes in the Hadoop cluster is relatively low.

SUMMARY

According to a first aspect of embodiments of the present disclosure, a method for detecting a slow node includes: obtaining a generated record for a first storage node, the generated record including: a storage node generation time, and a number of times and consuming time for transmitting data to second storage nodes other than the first storage node; obtaining a valid record from the generated record, the valid record being generated within a preset time period, and the preset time period being within a time period between the storage node generation time and a current time; determining an average consuming time for the first storage node transmitting the data to each of the second storage nodes, based on the number of times and the consuming time in the valid record; and detecting the slow node in the second storage nodes based on the average consuming time.

According to a second aspect of the embodiments of the present disclosure, a device for detecting a slow node includes: a processor; and a memory storing instructions executable by the processor, wherein the processor is configured to: obtain a generated record for a first storage node, the generated record including: a storage node generation time, and a number of times and consuming time for transmitting data to second storage nodes other than the first storage node; obtain a valid record from the generated record, the valid record being generated within a preset time period, and the preset time period being within a time period between the storage node generation time and a current time; determine an average consuming time for the first storage node transmitting the data to each of second storage nodes, based on the number of times and the consuming time included in the valid record; and detect the slow node in the second storage nodes based on the average consuming time.

According to a third aspect of the embodiments of the present disclosure, a non-transitory computer-readable storage medium has stored therein instructions that, when executed by a processor of a device, cause the device to perform the method for detecting a slow node according to the first aspect.

The technical solution provided by the embodiments of the present disclosure may include the following beneficial effects: by searching for the record that a difference between the generation time of the record and the current time is within a preset time interval as the valid record, and calculating the average consuming time based on the generation time of the record in the valid record, the timeliness of calculating the average consuming time may be ensured, thereby improving the accuracy of detecting the slow node based on the average consuming time.

It should be noted that the above general description and the following detailed description are merely exemplary and explanatory and should not be construed as limiting of the present disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the present invention as recited in the appended claims.

Figure 1:
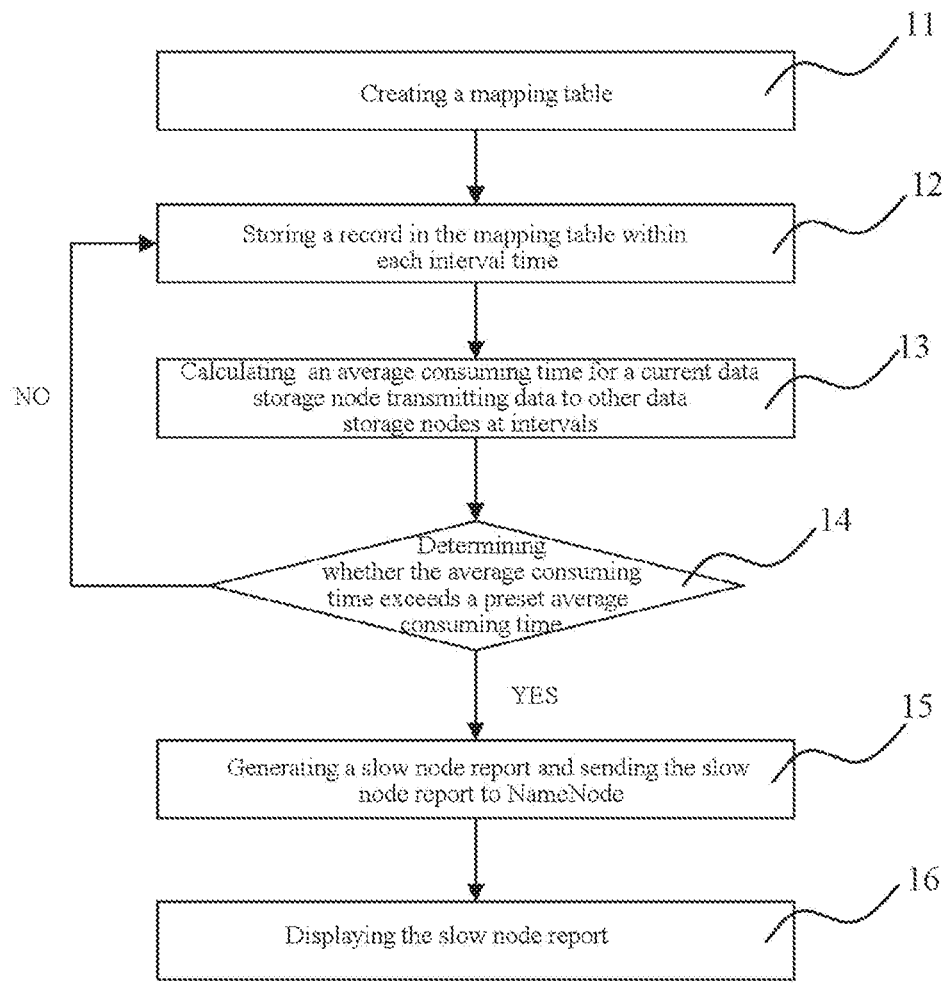
FIG. 1 is a flowchart of a method for detecting a slow node according to some embodiments.
Figure 2:
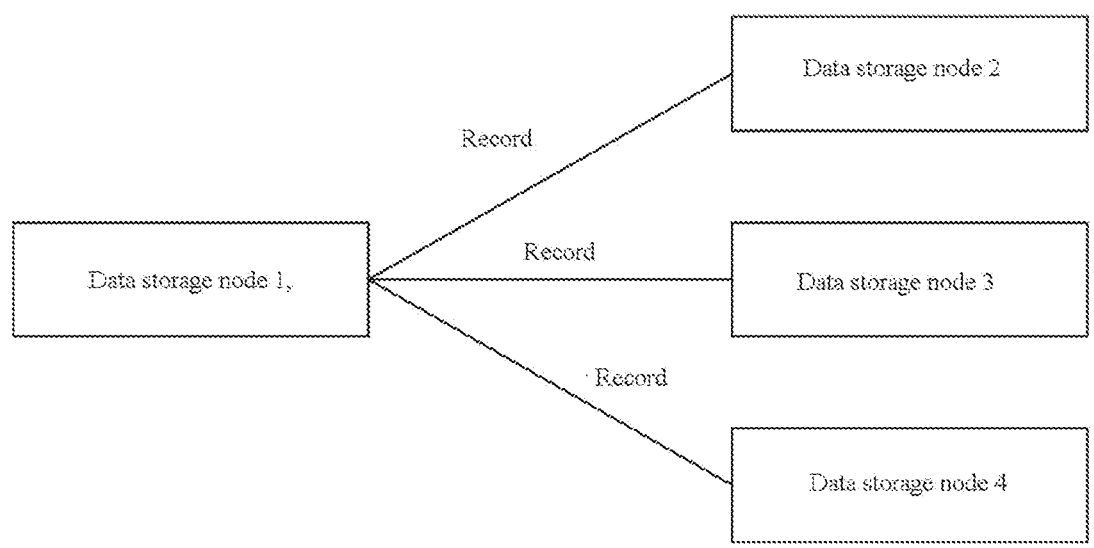
FIG. 2 is a schematic diagram of a record generated by a current data storage node and each other data storage node according to some embodiments.

FIG. 1 is a flow chart of a method for detecting a slow node in a Hadoop cluster according to some embodiments. Referring to FIG. 1, the method includes the following steps. In step 11, a mapping table is created through a DataNode. In step 12, a record within each interval time is obtained and stored in the mapping table. For example, a key of the mapping table is an ID identifier of a second storage node, and the value thereof is a queue of a fixed size. The records include a consuming time for the current data storage node transmitting data to other data storage nodes. If the records stored in the queue exceed the fixed size of the queue and a new record is to be added to the queue, the queue removes the first record in the queue and stores the newly added record to the end of the queue. If the data storage node transmits the data to other data storage nodes, each of the current data storage node and each other data storage node generate one record, as shown in FIG. 2, which is a schematic diagram of one record generated by each of a current data storage node and each other data storage node.

In step 13, based on the records stored in the queue, the current data storage node calculates an average consuming time for the current data storage node transmitting data to other data storage nodes at regular intervals. In step 14, the current data storage node determines whether the average consuming time exceeds a preset average consuming time. For example, if the average consuming time for the current data storage node transmitting data to the data storage node 1 exceeds the preset average consuming time, it means that the data storage node 1 is the slow node and, in step 15, a slow node report including a slow node address is generated through the DataNode and the slow node report is sent to the NameNode through the DataNode. In step 16, the slow node report is displayed based on a management page of the NameNode. An administrator of distributed file storage system can log in the management page of the NameNode to view the slow node report, and determine the DataNode corresponding to the slow node according to the slow node address in the slow node report. The administrator of distributed file storage system can notify relevant maintenance personnel to repair the DataNode to ensure speed of storing and analyzing massive data for the Hadoop cluster.

However, an accuracy of the above method for detecting the slow node in the Hadoop cluster may be low. For example, the DataNode that has been monitored as the slow node, after a time period, the speed of the network data transmission or the data reading and writing on the disk returns to a normal level, then the DataNode that has been monitored as the slow node no longer belongs to the slow node.

To improve the detecting accuracy, exemplary embodiments of the present disclosure provide a method for detecting a slow node that may include searching a record that a difference between a generation time of the record and a current time is within a preset time interval as a valid record, and calculating an average consuming time based on the generation time of the record in the valid record, which may ensure the timeliness of calculating the average consuming time, thereby improving an accuracy of determining, based on the average consuming time, whether there is a slow node for a first storage node transmitting the data to each of other second storage node, so that the accuracy of detecting the slow node in the Hadoop cluster is high.

Figure 3:
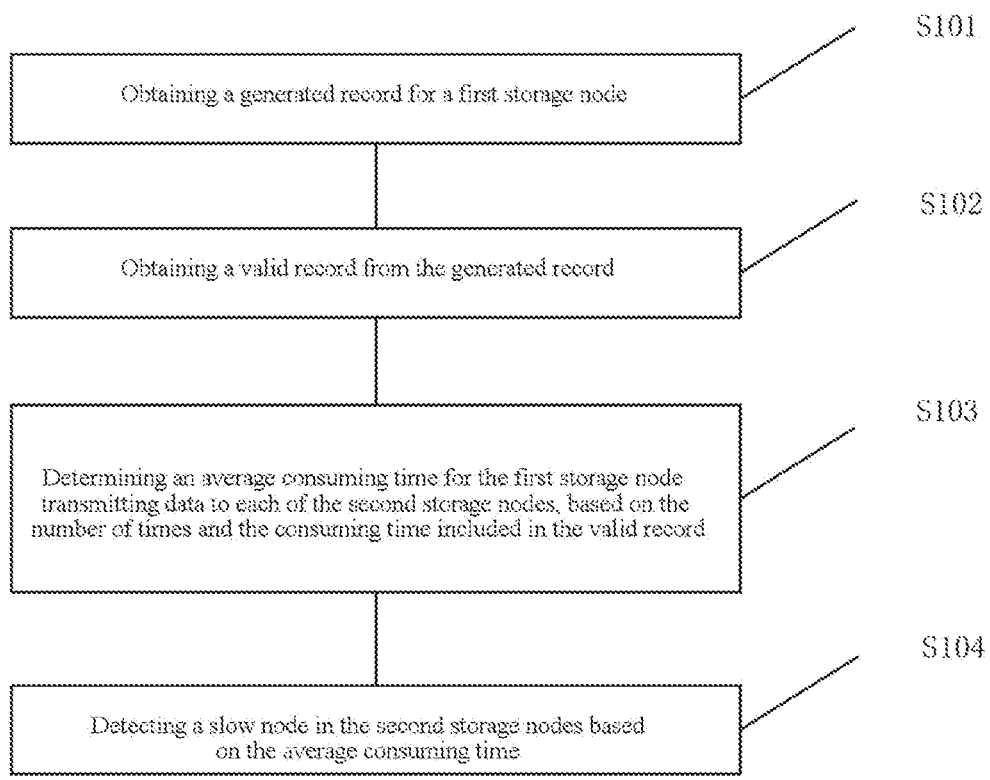
FIG. 3 is a flowchart showing a method for detecting a slow node according to an exemplary embodiment.

FIG. 3 is a method for detecting a slow node according to an exemplary embodiment. For example, the method may be applied to a Hadoop cluster. As shown in FIG. 3, the method may include steps S101 to S104.

In step S101, a generated record is obtained for a first storage node.

In an embodiment, the record is generated by the DataNode.

In an embodiment, the generated record is stored in a mapping table.

In an embodiment, the generated record includes a storage node generation time, a number of times and consuming time for transmitting data to second storage nodes other than the first storage node.

In step S102, a valid record is obtained from the generated record. For example, the record with a difference between the generation time of the record and a current time being within a preset time interval is searched for and obtained as the valid record.

In an embodiment, the preset time interval for searching for the valid record can be set, and based on the preset time interval, the record within the preset time interval is obtained as the valid record to improve accuracy.

In an embodiment, the preset time interval is appropriately customized according to an actual data storage condition of the DataNode. For example, the preset time interval may be 3 hours to make the timeliness of calculating the average consuming time better.

Further, the record with a difference between the generation time of the record and the current time being within the preset time interval, as the valid record, is searched for periodically at regular interval according to the preset time interval. The time for periodically searching for the valid record is appropriately customized according to the actual data storage condition of the DataNode. For example, in an embodiment, the time for periodically searching for the valid record is 5 minutes, and the record is searched every 5 minutes to obtain the record that meets the condition as the valid record, so that the timeliness of the valid record is better.

In step S103, an average consuming time for the first storage node transmitting data to each of the second storage nodes is determined, based on the number of times and the consuming time included in the valid record.

In the embodiment, based on the preset time interval, the record within the preset time interval is obtained as the valid record, and the average consuming time for the first storage node transmitting the data to each of the second storage nodes is calculated based on the valid record to ensure that the calculated average consuming time reflects the average consuming time in the preset time interval, which has the timeliness.

In step S104, the slow node is detected in the second storage nodes based on the average consuming time.

For example, if the average consuming time exceeds a preset average consuming time, it can be determined that there exists the slow node during the first storage node transmitting the data to other second storage nodes; and if the average consuming time does not exceed the preset average consuming time, it can be determined that there exists no slow node for the first storage node transmitting the data to other second storage nodes.

In an embodiment, the preset average consuming time can be appropriately customized based on the actual storage data condition of the DataNodes in the Hadoop cluster. For example, the preset average consuming time can be 1000 milliseconds.

In an embodiment, in determining that there exists the slow node for the first storage node transmitting the data to other second storage nodes, it may be further required to search for the slow node. Searching for the slow node may adopt the following manner. The consuming time for the first storage node transmitting the data to each of other second storage nodes is found. Based on the consuming time for the first storage node transmitting the data to each of the other second storage nodes, the data storage node that exceeds a preset consuming time threshold is searched for and obtained as the slow node. The preset consuming time threshold is appropriately customized according to the actual data storage condition of the DataNode. For example, the preset consuming time threshold may be 1000 milliseconds.

In the above embodiments, the record with a difference between the generation time of the record and the current time is within a preset time interval is obtained as the valid record, and then the average consuming time is calculated based on the generation time of the record in the valid record, which ensures the timeliness of calculating the average consuming time, thereby improving the accuracy of determining, based on the average consuming time, whether there is a slow node for the first storage node transmitting the data to each of the other second storage nodes, so that the accuracy of detecting the slow node in the Hadoop cluster is improved.

Figure 4:
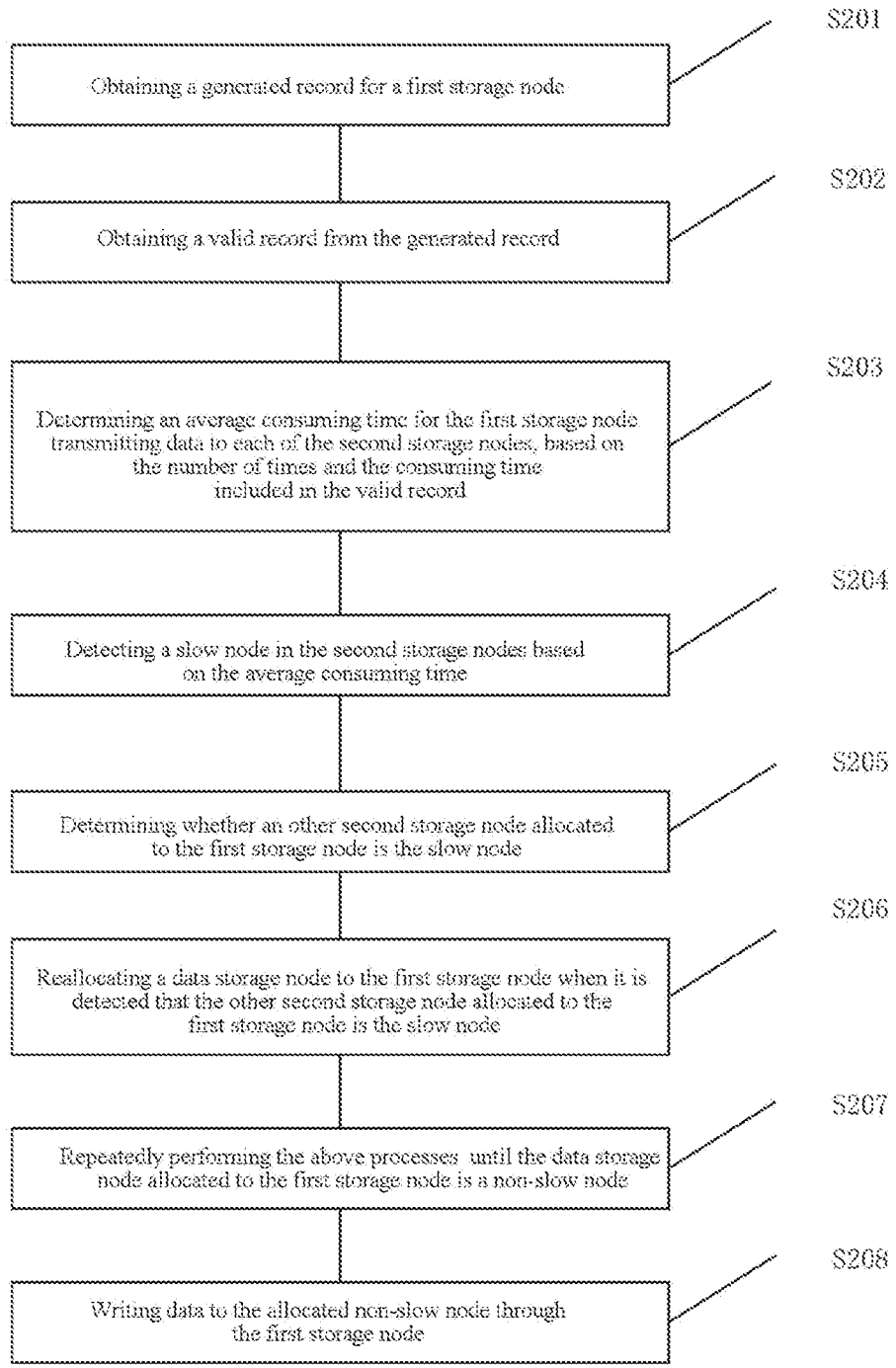
FIG. 4 is a flowchart showing a method for detecting a slow node according to an exemplary embodiment.

FIG. 4 is a flow chart of a method for detecting a slow node according to an exemplary embodiment. For example, the method may be applied to a Hadoop cluster. As shown in FIG. 4, the method may include steps S201 to S208. Steps S201 to S204 are the same as steps S101 to S104 in FIG. 3, and are not repeated here.

In step S205, it is determined whether another second storage node allocated to the first storage node is a slow node.

In step S206, when it is detected that another second storage node allocated to the first storage node is the slow node, that data storage node is reallocated to the first storage node.

In step S207, the above steps are repeatedly performed until the data storage node allocated to the first storage node is a non-slow node.

In step S208, the data is written to the allocated non-slow node through the first storage node.

Figure 5:
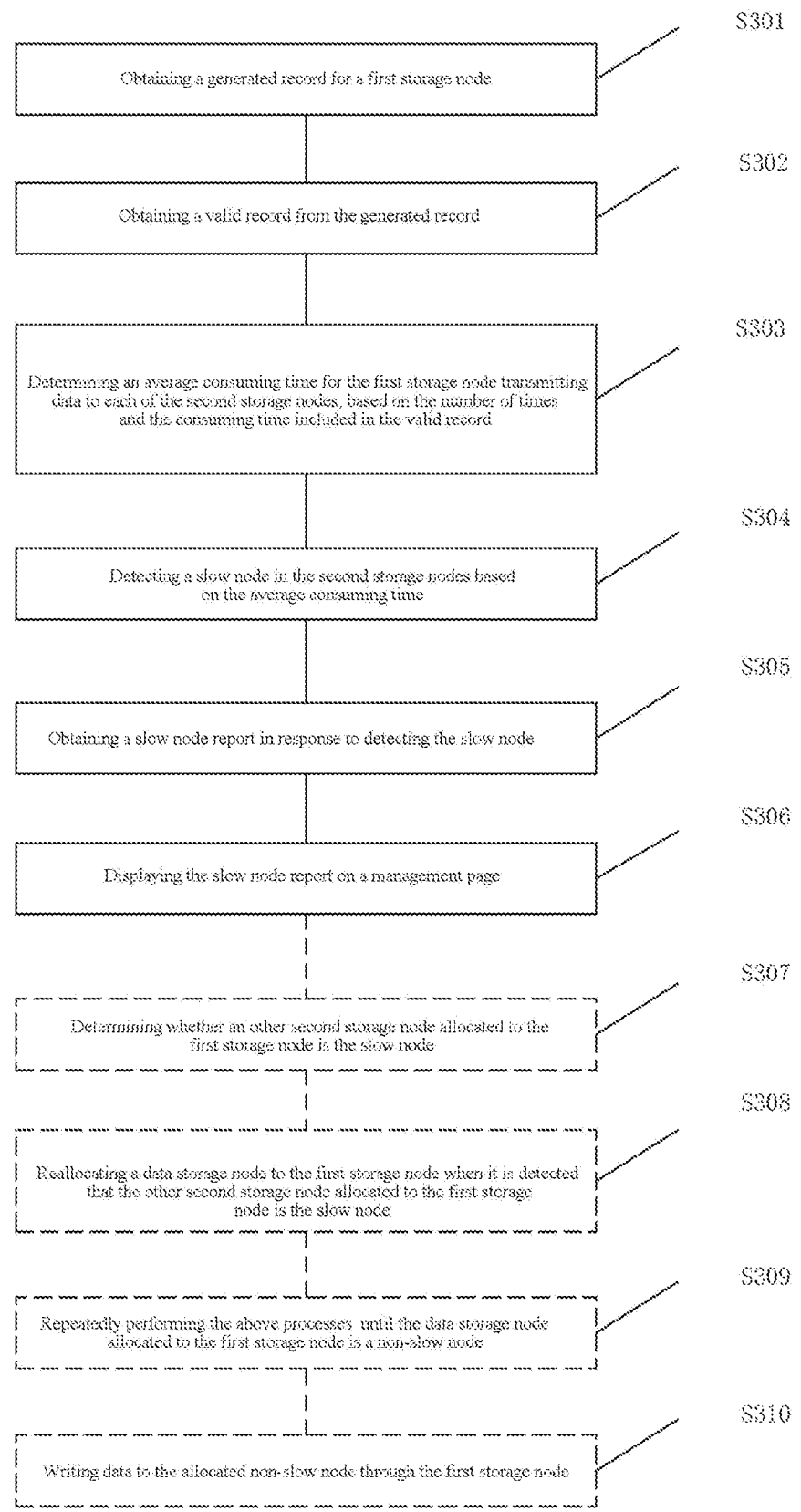
FIG. 5 is a flowchart showing a method for detecting a slow node according to an exemplary embodiment.

In some embodiments, because the slow node report only includes the slow node address, the current Hadoop cluster can only display the slow node address based on the management page of the NameNode. The displayed information is simple. FIG. 5 is a flow chart of a method for detecting a slow node according to an exemplary embodiment. For example, the method may be applied to the Hadoop cluster, and may improve slow node information displayed by the Hadoop cluster. Referring to FIG. 5, the method may include steps S301 to S306. Steps S301 to S304 are the same as steps S101 to S104 in FIG. 3, and are not repeated here.

In step S305, the slow node report is obtained in response to detecting the slow node.

In an embodiment, the slow node report includes an address of the slow node, the consuming time for transmitting data to each of the second storage nodes and the generation time of the slow node report. In the slow node report, related information involved in the slow node report can be displayed in the form of a list.

In an embodiment, one slow node report may be generated for each of the data storage nodes and one other data storage node which is a slow node. In an embodiment, multiple slow node reports may be generated for each of the data storage nodes and multiple other data storage nodes which are slow nodes. For example, if the consuming time for the data storage node 1 transmitting the data to the data storage node 2 exceeds the preset consuming time threshold, one slow node report is generated, and the slow node report is sent to the NameNode by the data storage node 1. It is assumed that the consuming times for the data storage node 1 transmitting the data to the data storage node 2, the data storage node 3, and the data storage node 4 all exceed the preset consuming time threshold, three slow node reports are generated, and the three slow node reports are sent to the NameNode by the data storage node 1.

In step S306, the slow node report is displayed on a management page.

In an embodiment, all the slow node reports are aggregated, and the aggregated slow node reports are displayed based on the management page of the NameNode.

Because the slow node report includes an address of the slow node, the consuming time for transmitting data to each of the second storage nodes and the generation time of the slow node report, the administrator of the distributed file storage system can log into the management page of the NameNode to view the slow node report, and determine the DataNode corresponding to the slow node address, the consuming time for the first storage node transmitting data to each of the second storage nodes and the generation time of the slow node report, which enriches the slow node information displayed by the Hadoop cluster. Further, the administrator of the distributed file storage system can determine the order of processing the DataNode corresponding to the slow node according to the order of the consuming time spans for the first storage node transmitting data to each of other second storage nodes, so as to increase the speed of storing and analyzing mass data of the Hadoop cluster.

In an embodiment, steps S307 to S310 shown by the dotted lines in FIG. 5 may be further executed. These steps are the same as the steps S205 to S208 in FIG. 4, and details are not described herein again.

Figure 6:
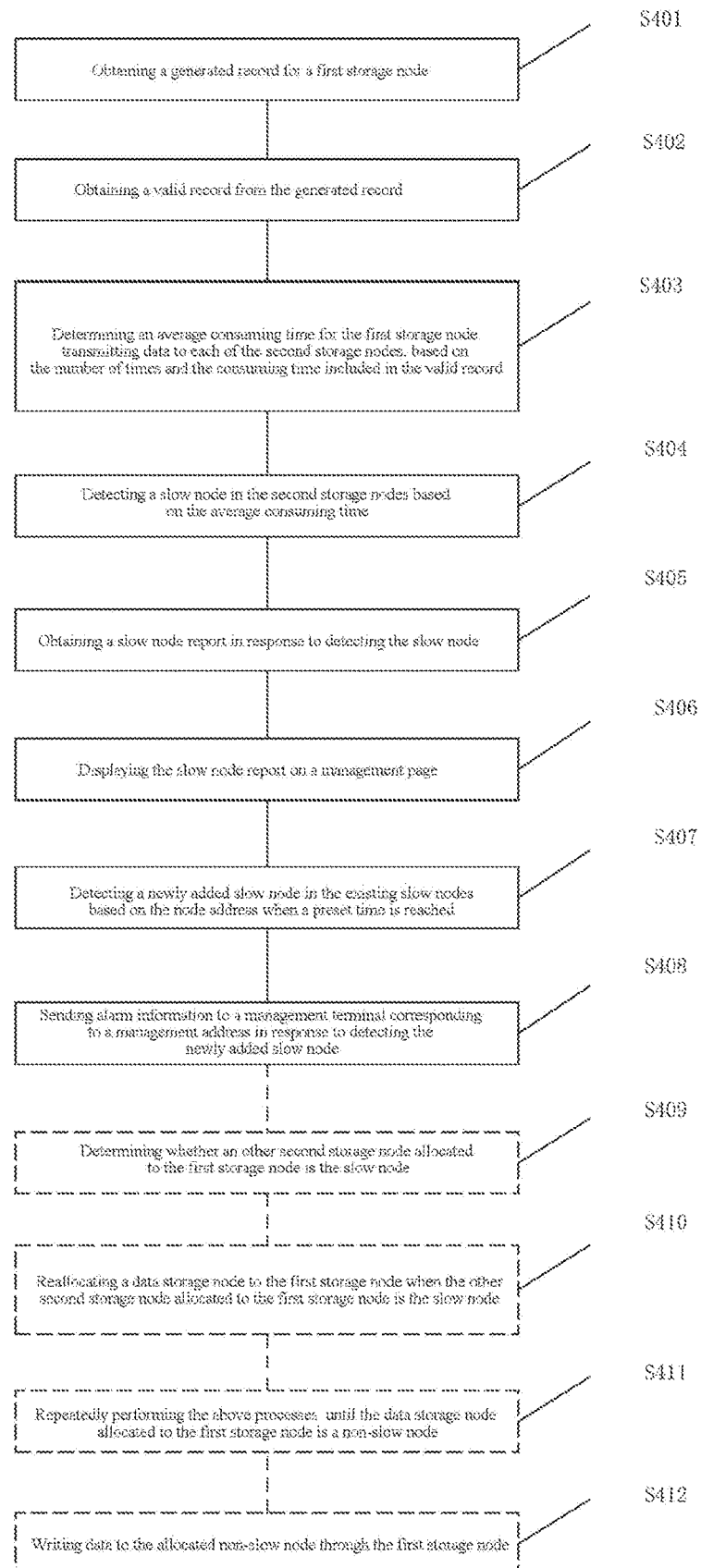
FIG. 6 is a flowchart showing a method for detecting a slow node according to an exemplary embodiment.

In some embodiments, the administrator of the distributed file storage system can view whether a new slow node is added to the slow node report only after logging into the management page of the NameNode, and cannot know in time the information of the new slow node added to the slow node report, which may result in that the DataNode corresponding to the slow node newly added to the slow node report cannot be processed in time, and affect the speed of the Hadoop cluster to store and analyze massive data. FIG. 6 is a flow chart of a method for detecting a slow node according to an exemplary embodiment. For example, the method may be applied to the Hadoop cluster, and may improve the processing speed of the Hadoop cluster to store and analyze massive data. Referring to FIG. 6, the method may include steps S401 to S408. Steps S401 to S406 are the same as steps S301 to S306 in FIG. 5, and are not repeated here.

In step S407, when a preset time is reached, a newly added slow node is detected in the existing slow nodes based on the node address.

In an embodiment, based on a program that monitors the status of the Hadoop cluster, the Hadoop cluster queries the displayed slow node report in the background based on the node address to see if there is a newly added slow node, when the preset time is reached. When the preset time is reached, it is within a preset query time interval.

In an embodiment, the preset query time interval is customized according to the NameNode and the DataNode. For example, the preset query interval may be one minute, and then the slow node report information displayed on the management interface of the NameNode is queried in the background every other minute.

In step S408, alarm information is sent to a management terminal corresponding to a management address in response to detecting the newly added slow node.

In an embodiment, the management address includes at least one of an email address and a designated terminal address.

In an embodiment, the Hadoop cluster can send the alarm information to the mailbox of the administrator of the distributed file storage system by mail. In an embodiment, the Hadoop cluster can send the alarm information to an administrator terminal of the distributed file storage system by a short message.

In an embodiment, the administrator terminal of the distributed file storage system may be referred to as user equipment (UE), a mobile station (MS), a mobile terminal (MT), etc., which is a device for providing voice and/or data connectivity for a user. For example, the terminal may be a handheld device or a vehicle-mounted device with a wireless connection function, and the like. Examples of the terminal are: a mobile phone, a pocket personal computer (PPCs), a handheld computer, a personal digital assistant (PDA), a notebook computer, a tablet computer, a wearable device, an internet of thing (IoT) client or a vehicle-mounted device.

In an embodiment, the alarm information may include the DataNode corresponding to the slow node newly added to the slow node report, the generation time of the slow node report, and the consuming time for the first storage node transmitting the data to the second storage node.

In the above embodiments, the administrator of the distributed file storage system can know according to the received alarm information that a new slow node is added to the slow node report, and know the DataNode corresponding to the new slow node according to the alarm information, which can increase the speed of processing the DataNode corresponding to the new slow node, and then increase the speed of the Hadoop cluster to store and analyze massive data.

In an embodiment, steps S409 to S412 shown by the dotted lines in FIG. 6 may be further executed. These steps are the same as the steps S205 to S208 in FIG. 4, and details thereof are not described herein again.

Figure 7:
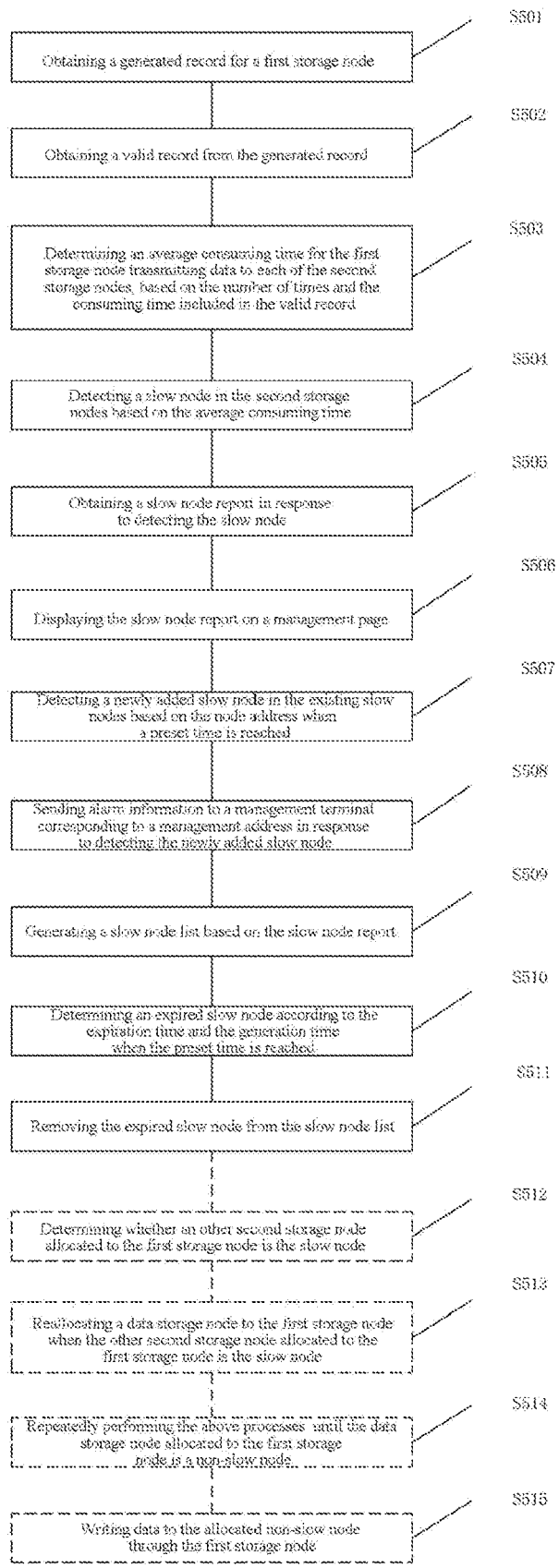
FIG. 7 is a flowchart showing a method for detecting a slow node according to an exemplary embodiment.

In some embodiments, after detecting the slow node in the Hadoop cluster, the slow node information is displayed on the management page of the NameNode, but the DataNode corresponding to the slow node remains during the data storage process, which may affect the speed of the Hadoop cluster to store and analyze massive data. FIG. 7 is a flow chart of a method for detecting a slow node according to an exemplary embodiment. For example, the method may be applied to the Hadoop cluster, and may improve the processing speed of the Hadoop cluster to store and analyze massive data. Referring to FIG. 7, the method may include steps S501 to S511. Steps S501 to S508 are the same as steps S401 to S408 in FIG. 6, and details thereof are not described herein again.

In step S509, a slow node list is generated based on the slow node report.

In an embodiment, the slow node list includes a slow node address and a slow node expiration time. The slow node expiration time can be preset in advance, and can be set to be different time periods according to different needs.

In an embodiment, it is suspended to send a matching data storage node and a data storage instruction to the DataNode corresponding to the slow node within the expiration time.

In step S510, when the preset time is reached, an expired slow node is determined according to the expiration time and the generation time.

In an embodiment, it is checked at regular intervals or periodically whether there is the expired slow node in the slow node list. The expired slow node is determined according to the expiration time and the generation time of the slow node report of the slow node. For example, the expiration time is set to be 0.5 hour, and if the generation time of the slow node report for the certain slow node is at 8 AM, then 8:30 AM is the expiration time of the slow node. That is, when the time is 8:30 AM, the slow node is determined to be an expired slow node.

In an embodiment, the Hadoop cluster queries the slow node report based on the NameNode background thread at intervals. If a new slow node is found to be added, the slow node list is updated based on the slow node report. The interval is customized according to the NameNode and the DataNode. For example, the interval can be one minute, and the Hadoop cluster queries the slow node report displayed on the management interface of the NameNode based on the NameNode background thread every one minute, and updates the slow node list.

In an embodiment, the slow node list is the mapping table, and the slow node list may add or delete the record of the slow node and the slow node at any time.

In step S511, the expired slow node is removed from the slow node list.

In an embodiment, if the current time is greater than the expiration time of the slow node, the slow node is the expired slow node, and the expired slow node is removed from the slow node list.

In the above embodiments, after the slow node in the Hadoop cluster is detected, the DataNode corresponding to the slow node can be automatically removed during the data storage process, which improves the speed of the Hadoop cluster to store and analyze massive data.

In an embodiment, steps S512 to S515 shown by the dotted lines in FIG. 7 may be further executed. These steps are the same as the steps S205 to S208 in FIG. 4, and details thereof are not described herein again.

Figure 8:
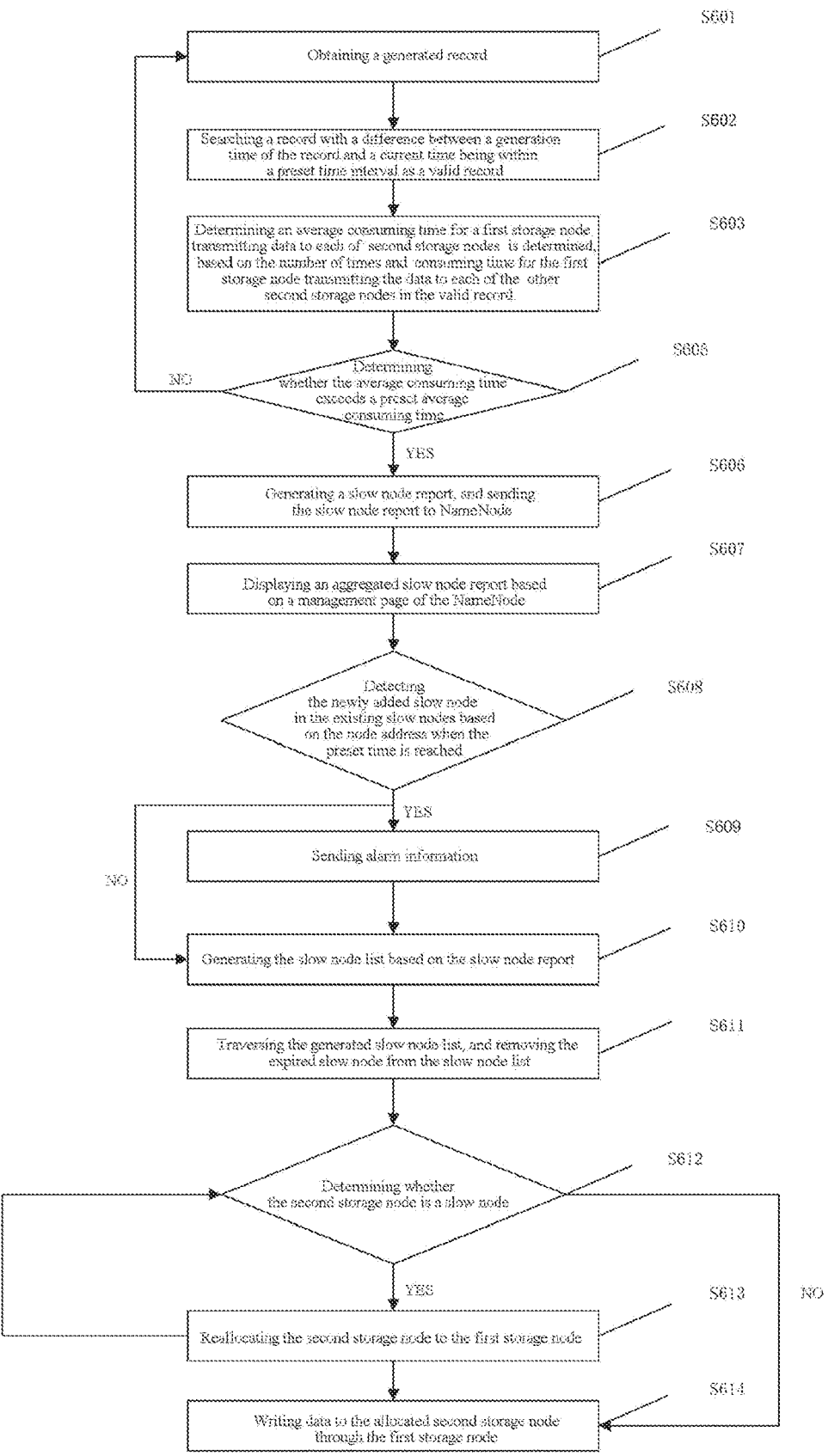
FIG. 8 is a flowchart showing a method for detecting a slow node according to an exemplary embodiment.

FIG. 8 is a flowchart showing a method for detecting a slow node according to an exemplary embodiment. For example, the method may be applied to the Hadoop cluster. Referring to FIG. 8, the method may include steps S601 to S614.

In step S601, a generated record is obtained.

In step S602, a record with a difference between the generation time of the record and the current time being within a preset time interval is searched for as the valid record.

In step S603, an average consuming time for a first storage node transmitting the data to each of second storage nodes is determined, based on the number of times and the consuming time for the first storage node transmitting data to each of the second storage nodes in the valid record.

In step S605, it is determined whether the average consuming time exceeds the preset average consuming time. If the average consuming time exceeds the preset average consuming time, step S606 is performed. If the average consuming time does not exceed the preset average consuming time, step S601 is performed.

In step S606, a slow node report is generated, and the slow node report is sent to the NameNode.

In step S607, an aggregated slow node report is displayed based on the management page of the NameNode.

In step S608, when a preset time is reached, the newly added slow node is detected in the existing slow nodes based on the node address. If there is the newly added slow node in the slow node report, step S609 is performed. If there is no newly added slow node in the slow node report, step S610 is performed.

In step S609, the alarm information is sent.

In step S610, the slow node list is generated based on the slow node report.

In step S611, the generated slow node list is traversed, and the expired slow node is removed from the slow node list.

In step S612, it is determined whether the second storage node is a slow node. If the second storage node is a slow node, step S613 is performed. If the second storage node is a non-slow node, step S614 is performed.

In step S613, the second storage node is reallocated to the first storage node, and step S612 is performed.

In step S614, data is written to the allocated second storage node through the first storage node.

Figure 9:
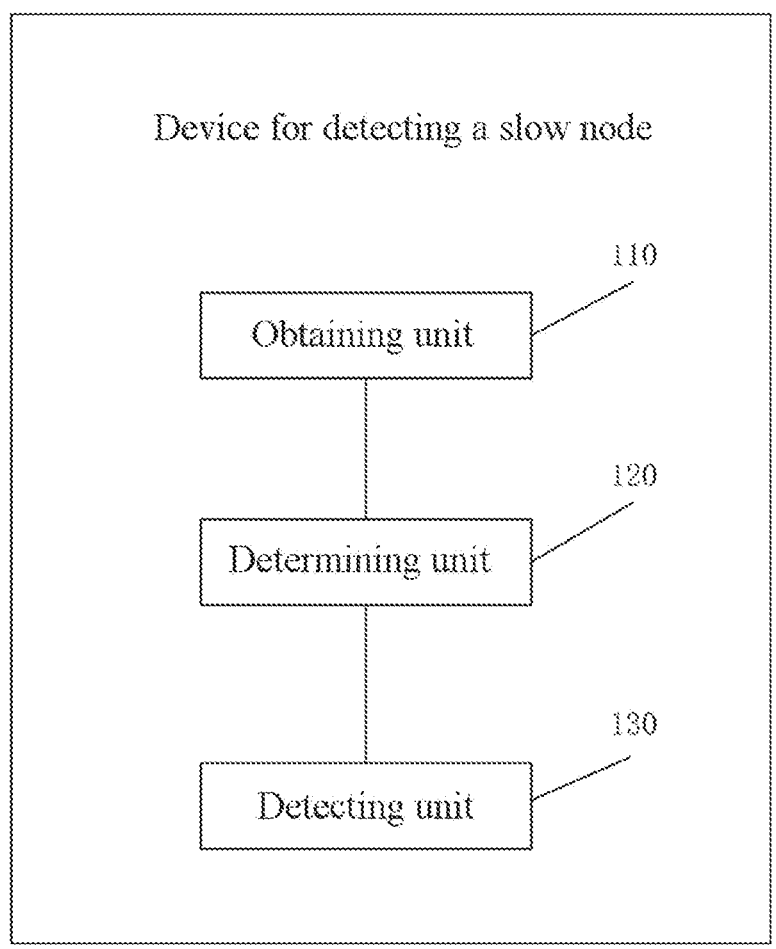
FIG. 9 is a block diagram showing a device for detecting a slow node according to an exemplary embodiment.

FIG. 9 is a block diagram showing a device for detecting a slow node according to an exemplary embodiment. Referring to FIG. 9, the device includes an obtaining unit 110, a determining unit 120, and a detecting unit 130.

The obtaining unit 110 is configured to obtain a generated record for a first storage node and obtain a valid record from the generated record. The generated record includes a generation time of a storage node, a number of times and consuming time for transmitting data to second storage nodes other than the first storage node. The valid record includes a record within a preset time period, and the preset time period is within a time period between the generation time and a current time.

The determining unit 120 is configured to determine an average consuming time for the first storage node transmitting the data to each of the second storage nodes, based on the number of times and the consuming time included in the valid record.

The detecting unit 130 is configured to detect the slow node in the second storage nodes based on the average consuming time.

Figure 10:
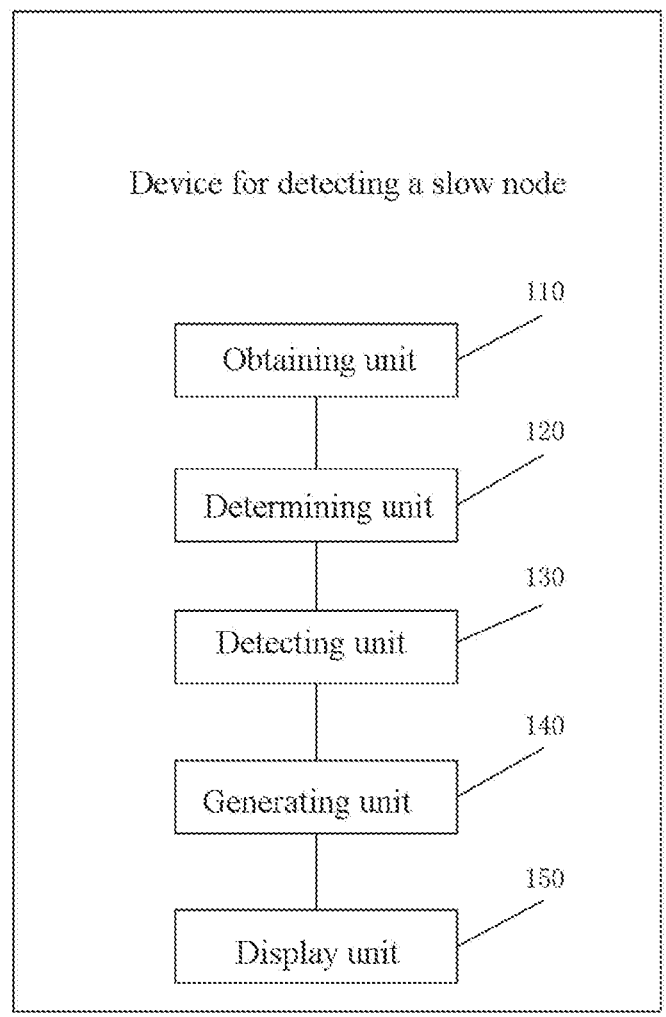
FIG. 10 is a block diagram showing a device for detecting a slow node according to an exemplary embodiment.

FIG. 10 is a block diagram showing a device for detecting a slow node according to an exemplary embodiment. Referring to FIG. 10, the device further includes a generating unit 140 and a display unit 150.

The generating unit 140 is configured to obtain a slow node report in response to detecting the slow node, the slow node report including a node address of the slow node, the consuming time for transmitting data to each of the second storage nodes and the generation time of the slow node report.

The display unit 150 is configured to display the slow node report on a management page.

Figure 11:
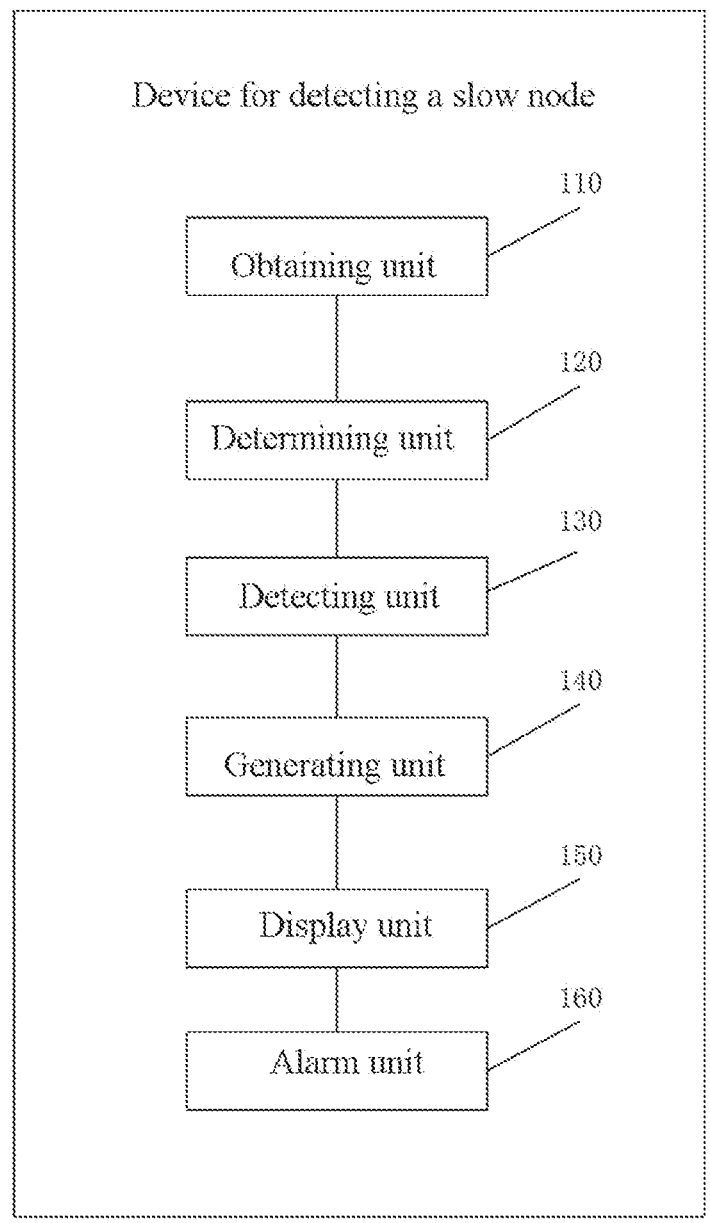
FIG. 11 is a block diagram showing a device for detecting a slow node according to an exemplary embodiment.

FIG. 11 is a block diagram showing a device for detecting a slow node according to an exemplary embodiment. Referring to FIG. 11, the device further includes an alarm unit 160.

The detecting unit 130 is further configured to detect a newly added slow node in existing slow nodes based on the node address when a preset time is reached.

The alarm unit 160 is configured to send alarm information to a management terminal corresponding to a management address in response to detecting the newly added slow node, the management address including at least one of an email address and a designated terminal address.

Figure 12:
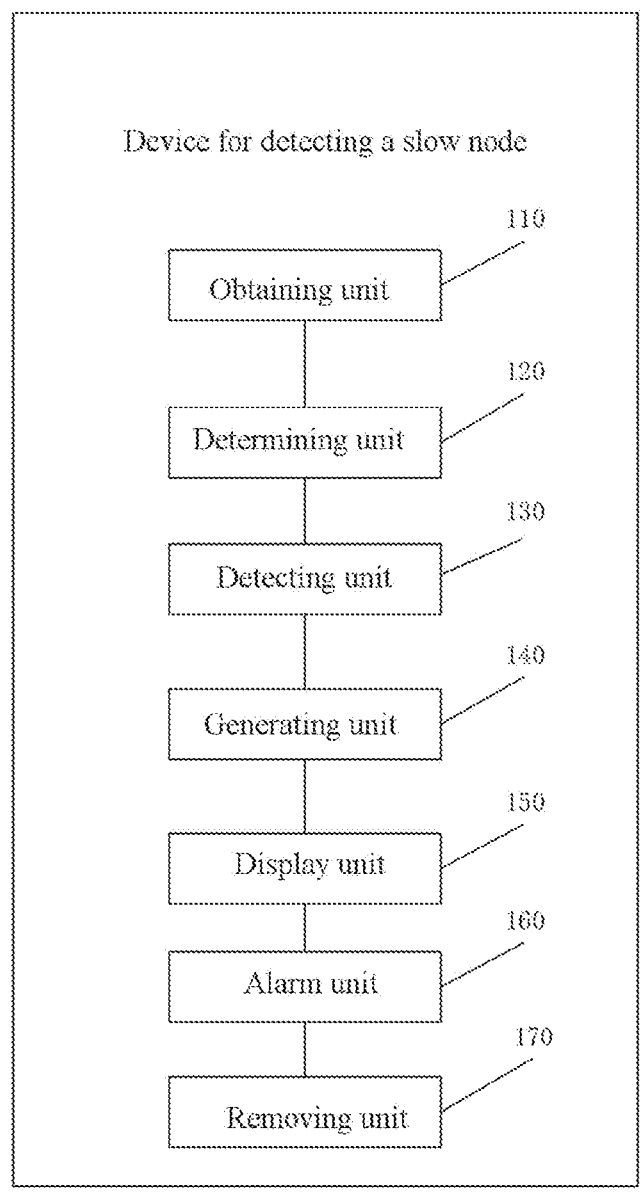
FIG. 12 is a block diagram showing a device for detecting a slow node according to an exemplary embodiment.

FIG. 12 is a block diagram showing a device for detecting a slow node according to an exemplary embodiment. Referring to FIG. 12, the device further includes a removing unit 170.

The removing unit 170 is configured to remove an expired slow node from the slow node list.

The generating unit 140 is further configured to generate a slow node list based on the slow node report, the slow node list including the node address of the slow node and an expiration time of the slow node. The determining unit 120 is further configured to determine an expired slow node according to the expiration time and the generation time, when the preset time is reached.

Figure 13:
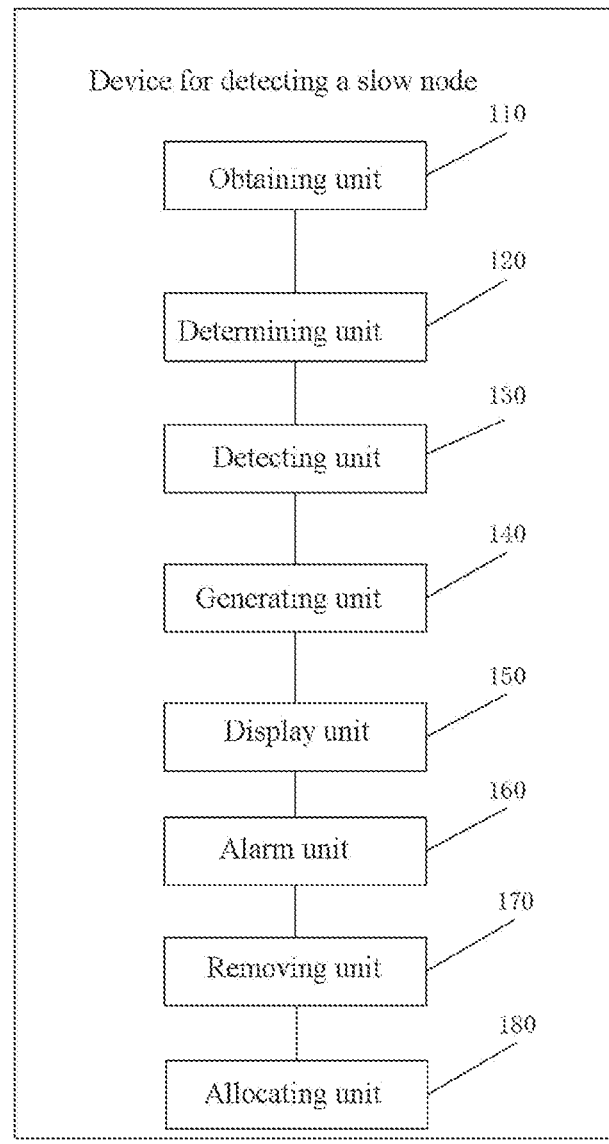
FIG. 13 is a block diagram showing a device for detecting a slow node according to an exemplary embodiment.

FIG. 13 is a block diagram showing a device for detecting a slow node according to an exemplary embodiment. Referring to FIG. 13, the device further includes an allocating unit 180.

The allocating unit 180 is configured to reallocate the second storage node for the first storage node, when the second storage node is the slow node; and write data to a allocated second storage node through the first storage node, when the second storage node is a non-slow node.

Regarding the device in the above embodiments, the specific manner in which each unit performs operations has been described in detail in the embodiments of the method, and will not be repeated here.

Figure 14:
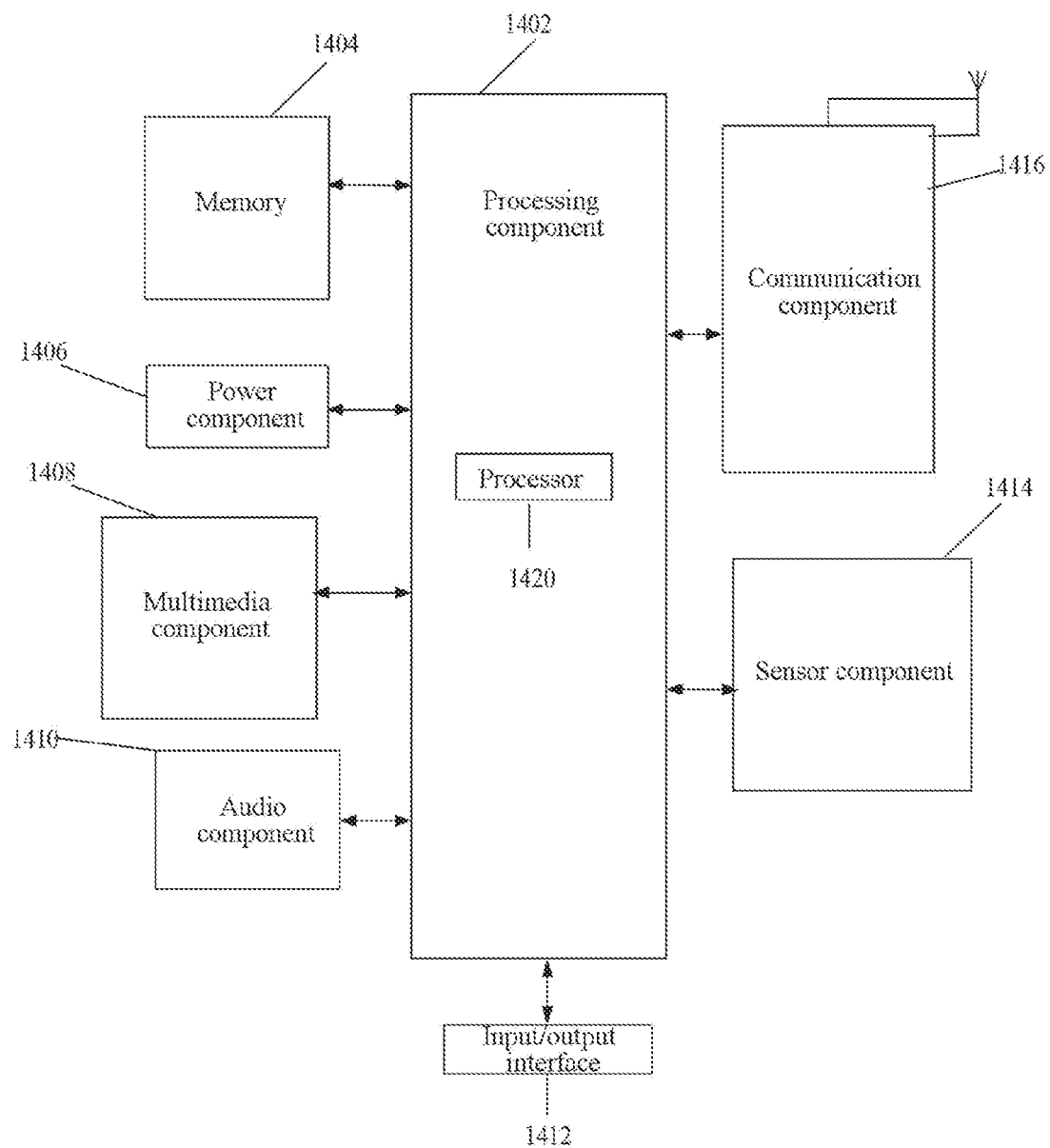
FIG. 14 is a block diagram showing a device according to an exemplary embodiment.

FIG. 14 is a block diagram showing a device for detecting a slow node according to an exemplary embodiment. For example, the device may be a mobile phone, a computer, a digital broadcasting terminal, a messaging device, a game console, a tablet device, a medical device, a fitness device, a personal digital assistant, and the like.

Referring to FIG. 14, the device may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device, such as operations associated with display, telephone calls, data communications, camera operations, and recording operations. The processing component 1402 can include one or more processors 1420 to execute instructions to perform all or part of the steps in the above described methods. Moreover, the processing component 1402 can include one or more modules to facilitate the interaction between the processing component 1402 and other components. For example, the processing component 1402 can include a multimedia module to facilitate the interaction between the multimedia component 1408 and the processing component 1402.

The memory 1404 is configured to store various types of data to support the operation of the device. Examples of such data include instructions for any application or method operated on device, such as contact data, phone book data, messages, pictures, videos, and the like. The memory 1404 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device. The power component 1406 can include a power management system, one or more power sources, and other components associated with the generation, management, and distribution of power in the device.

The multimedia component 1408 includes a screen providing an output interface between the device and the user t. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. When the device is in an operation mode, such as a photographing mode or a video mode, the front camera and/or the rear camera can receive external multimedia datum. Each of the front camera and the rear camera may be a fixed optical lens system or have focus and optical zoom capability.

The audio component 1410 is configured to output and/or input an audio signal. For example, the audio component 1410 includes a microphone (MIC) configured to receive an external audio signal when the device is in an operation mode, such as a call mode, a recording mode, and a voice recognition mode. The received audio signal may be further stored in the memory 1404 or sent via the communication component 1416. In some embodiments, the audio component 1410 also includes a speaker for outputting the audio signal.

The I/O interface 1412 provides an interface between the processing component 1402 and peripheral interface modules, such as a keyboard, a click wheel, buttons, and the like. These buttons may include, but are not limited to, a home button, a volume button, a starting button, and a locking button.

The sensor component 1414 includes one or more sensors for providing status assessments of various aspects of the device. For example, the sensor component 1414 can detect an open/closed status of the device, relative positioning of components, such as the display and the keypad of the device. The sensor component 1414 can also detect a change in position of one component of the device or the device, the presence or absence of user contact with the device, an orientation, or an acceleration/deceleration of the device, and a change in temperature of the device. The sensor component 1414 can include a proximity sensor configured to detect the presence of nearby objects without any physical contact. The sensor component 1414 can also include a light sensor, such as a CMOS or CCD image sensor, configured to use in imaging applications. In some embodiments, the sensor component 1414 can also include an accelerometer sensor, a gyroscope sensor, a magnetic sensor, a pressure sensor, or a temperature sensor.

The communication component 1416 is configured to facilitate wired or wireless communication between the device and other devices. The device can access a wireless network based on a communication standard, such as WiFi, 4G or 5G, or a combination thereof. In an exemplary embodiment, the communication component 1416 receives broadcast signals or broadcast associated information from an external broadcast management system via a broadcast channel. In an exemplary embodiment, the communication component 1416 also includes a near field communication (NFC) module to facilitate short-range communications. In an exemplary embodiment, the communication component 1416 can be implemented based on a radio frequency identification (RFID) technology, an infrared data association (IrDA) technology, an ultra-wideband (UWB) technology, a Bluetooth (BT) technology, and other technologies.

In an exemplary embodiment, the device may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including instructions, such as the memory 1404 including instructions executable by the processor 1420 of the device to perform the above described methods. For example, the non-transitory computer readable storage medium may be a ROM, a random access memory (RAM), a CD-ROM, a magnetic tape, a floppy disc, and an optical data storage device.

Although the operations in the embodiments of the present disclosure are described in a specific order in the drawings, they should not be construed as requiring that the operations be performed in the specific order or serial order shown, or that all operations shown be performed to get the desired result. In certain environments, multitasking and parallel processing may be advantageous.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for detecting a slow node, comprising:
   obtaining a plurality of records generated by a first storage node, each of the generated records comprising a generation time of the generated record, a number of transmissions and time durations of the number of transmissions for transmitting data to second storage nodes by the first storage node;
   selecting a record from the plurality of generated records, wherein a difference between a generation time of the selected record and a current time is within a preset time interval;

determining the selected record as a valid record;
determining an average time duration for the first storage node transmitting data to each of the second storage nodes based on a number of transmissions and time durations of the number of transmissions in the valid record; and
detecting the slow node in the second storage nodes based on the average time duration,
wherein detecting the slow node in the second storage nodes based on the average time duration comprises:
in response to the average time duration being greater than a preset average time duration, determining that the second storage nodes comprises the slow node;
determining respective time durations for the first storage node transmitting the data to respective second storage nodes; and
determining a second storage node corresponding to a time duration greater than a preset time duration threshold as the slow node.

2. The method according to claim 1, further comprising:
obtaining a slow node report in response to detecting the slow node, the slow node report comprising a node address of the slow node, the time duration for transmitting data to each of the second storage nodes and a generation time of the slow node report; and
displaying the slow node report on a management page.

3. The method according to claim 2, further comprising:
detecting a newly added slow node in existing slow nodes based on the node address when a preset time is reached; and
sending alarm information to a management terminal corresponding to a management address in response to detecting the newly added slow node, the management address comprising at least one of an email address or a designated terminal address.

4. The method according to claim 2, further comprising:
generating a slow node list based on the slow node report, the slow node list comprising the node address of the slow node and an expiration time of the slow node;
determining an expired slow node according to the expiration time and the generation time of the slow node report, when a preset time is reached; and
removing the expired slow node from the slow node list.

5. The method according to claim 1, further comprising:
reallocating a second storage node corresponding to the detected slow node for the first storage node; and
writing data to a second storage node not corresponding to the detected slow node through the first storage node.

6. A device for detecting a slow node, comprising:
a processor; and
a memory storing instructions executable by the processor,
wherein the processor is configured to:
obtain a plurality of records generated by a first storage node, each of the generated records comprising a generation time of the generated record, a number of transmissions and time durations of the number of transmissions for transmitting data to second storage nodes by the first storage node;
select a record from the plurality of generated records, wherein a difference between a generation time of the selected record and a current time is within a preset time interval;
determine the selected record as a valid record;
determine an average time duration for the first storage node transmitting data to each of the second storage nodes based on a number of transmissions and time durations of the number of transmissions in the valid record; and
detect the slow node in the second storage nodes based on the average time duration,
wherein detecting the slow node in the second storage nodes based on the average time duration comprises:
in response to the average time duration being greater than a preset average time duration, determining that the second storage nodes comprises the slow node;
determining respective time durations for the first storage node transmitting the data to respective second storage nodes; and
determining a second storage node corresponding to a time duration greater than a preset time duration threshold as the slow node.

7. The device according to claim 6, wherein the processor is further configured to:
obtain a slow node report in response to detecting the slow node, the slow node report comprising a node address of the slow node, the time duration for transmitting data to each of the second storage nodes and a generation time of the slow node report; and
display the slow node report on a management page.

8. The device according to claim 7, wherein the processor is further configured to:
detect a newly added slow node in existing slow nodes based on the node address when a preset time is reached; and
send alarm information to a management terminal corresponding to a management address in response to detecting the newly added slow node, the management address comprising at least one of an email address or a designated terminal address.

9. The device according to claim 7, wherein the processor is further configured to:
generate a slow node list based on the slow node report, the slow node list comprising the node address of the slow node and an expiration time of the slow node;
determine an expired slow node according to the expiration time and the generation time of the slow node report, when a preset time is reached; and
remove the expired slow node from the slow node list.

10. The device according to claim 6, wherein the processor is further configured to:
reallocate a second storage node corresponding to the detected slow node for the first storage node; and
write data to a second storage node not corresponding to the detected slow node through the first storage node.

11. A non-transitory computer-readable storage medium having stored thereon instructions that, when executed by a processor of a device, cause the device to perform a method for detecting a slow node, the method comprising:
obtaining a plurality of records generated by a first storage node, each of the generated records comprising a generation time of the generated record, a number of transmissions and time durations of the number of transmissions for transmitting data to second storage nodes by the first storage node;
selecting a record from the plurality of generated records, wherein a difference between a generation time of the selected record and a current time is within a preset time interval;
determining the selected record as a valid record;
determining an average time duration for the first storage node transmitting data to each of the second storage nodes based on a number of transmissions and time durations of the number of transmissions in the valid record; and detecting the slow node in the second storage nodes based on the average time duration, wherein detecting the slow node in the second storage nodes based on the average time duration comprises:

in response to the average time duration being greater than a preset average time duration, determining that the second storage nodes comprises the slow node;

determining respective time durations for the first storage node transmitting the data to respective second storage nodes; and determining a second storage node corresponding to a time duration greater than a preset time duration threshold as the slow node.

12. The non-transitory computer-readable storage medium according to claim 11, wherein the method further comprises:

obtaining a slow node report in response to detecting the slow node, the slow node report comprising a node address of the slow node, the time duration for transmitting data to each of the second storage nodes and a generation time of the slow node report; and displaying the slow node report on a management page.

13. The non-transitory computer-readable storage medium according to claim 12, wherein the method further comprises:

detecting a newly added slow node in existing slow nodes based on the node address when a preset time is reached; and sending alarm information to a management terminal corresponding to a management address in response to detecting the newly added slow node, the management address comprising at least one of an email address or a designated terminal address.

14. The non-transitory computer-readable storage medium according to claim 12, wherein the method further comprises:

generating a slow node list based on the slow node report, the slow node list comprising the node address of the slow node and an expiration time of the slow node;

determining an expired slow node according to the expiration time and the generation time of the slow node report, when a preset time is reached; and removing the expired slow node from the slow node list.

15. The non-transitory computer-readable storage medium according to claim 11, wherein the method further comprises:

reallocating a second storage node corresponding to the detected slow node for the first storage node; and writing data to a second storage node not corresponding to the detected slow node through the first storage node.

* * * * *